UNITED STATES PATENT OFFICE.

ALFRED ULRICH, OF ZURICH, SWITZERLAND, ASSIGNOR TO THE HOFFMANN-LA ROCHE CHEMICAL WORKS, OF NEW YORK, N. Y.

THERAPEUTICAL COMPOSITION CONTAINING A BROMID.

1,054,258. Specification of Letters Patent. Patented Feb. 25, 1913.

No Drawing. Application filed July 11, 1912. Serial No. 708,767.

*To all whom it may concern:*

Be it known that I, ALFRED ULRICH, a citizen of Switzerland, and a resident of Zurich, Switzerland, have invented a new and useful Therapeutical Composition Containing a Bromid, of which the following is a specification.

The present invention relates to a preparation containing bromin or bromin salts in such form that the use thereof will have marked therapeutical results in the treatment of epileptics.

It has been known for some time that advantageous results could be secured in the treatment of epileptics by the use of the salts of bromin and especially the alkali salts thereof, such for instance, as potassium bromid, sodium bromid or ammonium bromid. About ten years ago, certain French investigators made the observation that the number of epileptic attacks can be still further reduced if in preparing the food for the sick, cooking salt is entirely omitted from the food, and if in place of its chlorin, there is substituted bromin. It was ascertained that in order to prevent epileptic attacks, the essential factor is to reduce the chlorin contents of the blood. This reduction of the chlorin in the blood can only be brought about, even when unsalted food is used, by the consumption of bromin of such form and character that it is capable of taking the place of and representing the chlorin salt in the blood. Theoretically, this idea was found to be sound but it failed signally in practice as the result of an uncontrollable aversion of the patient against unsalted food. One meal thus prepared could be endured but successive meals could not. Any food prepared without the use of salt is unpalatable and in fact, in time its taste is disgusting and offensive, so that the patient after a few days of such food is unable to retain it at all. It has thus been known for some time that the bromin salts had a curative value but the problem how to enforce the consumption of such salts remained unsolved. Various attempts at a solution had been made. Some of them were so complicated that they could be carried out neither at home nor in a hospital. For instance, it was suggested that instead of using sodium chlorid, this substance be replaced in the initial preparation of the food by the sodium bromid. This substitution of the bromin salt for the chlorin salt does not work out in the case of vegetables, meats and soups, since the insipid and unsavory taste of these substances is not corrected by the use of sodium bromid. It has also been suggested to bake sodium bromid in bread and zwieback and even if it is considered that with regard to these special substances such a procedure can be carried out, any good effects will be counteracted by the chlorin salt, which necessarily accompanies the remaining food stuffs. Another attempt consisted in grouping together in different proportions about twenty spices, which, according to the special manner of their composition for each article of food was intended to reproduce the savor of the food as if it had been cooked with salt. As before stated, none of these suggestions have had practical results.

It is the object of this invention to prepare the bromin salt and to give it to the patients in a simple and palatable way, so that the advantages of a diet free from chlorin salt, together with the direct advantages resulting from the use of the bromin salts can be obtained, and that the unsalted food, when accompanied by this new bromin preparation shall be acceptable to the patient.

According to my invention I prepare a tablet or capsule composed of the appropriate bromin salt, such as sodium bromid, associated with vegetable albumin extracts obtained from dried soup greens, such for instance, as onions, beets, cabbages, etc. To this composition there may be added without injurious results small amounts of ordinary cooking salt and fat. This preparation, when added to cooked food products prepared without the use of salt, makes them palatable. When used in this combination and in this way, I have further found that the sodium bromid exercises an unexpectedly increased curative power.

The most important use to which this preparation is put is in connection with soups, since the diet of epileptics largely consists of soup. If they consume between three and four quarts of soup a day, this corresponds to the consumption of about 20 to 30 grams of sodium chlorid, which naturally calls for a correspondingly larger consumption of the bromin alkalis. When the soups are prepared without the use of salt, but with my tablets or capsules, the patients receive only 1.1 grams bromin salt and perhaps .1 gram chlorin salt from each tablet. My experiments have shown that a normal dose of bromin, when used in the form of my soup tablets is 2 to 4 grams. As each soup tablet contains about 50% bromin, four of such tablets would be sufficient in a favorable case, whereas, as above stated, it would require between upward of 20 to 30 grams of bromid if we were dealing only with the replacement of chlorid by the bromid. From this it appears that I am able to reduce very materially the quantity of bromin or bromin salts which the patient is required to consume. It is further very surprising that the effective action of the bromin, when prepared in tablet form according to my invention, is very materially greater than that of ordinary bromin salts. The same quantity of bromin salt, when consumed by the patient directly in connection with unsalted food does not have anywhere near the effect which it has when incorporated in my tablets. It is far more intense in the tablet form.

From the above description it will be seen that this invention consists mainly in the fact that I have discovered a method of supplying patients with bromin which permits the conversion into actual practice, or into practical results of the theory concerning the advantageous effects upon epileptics of unsalted diet, i. e. a diet free from chlorin salts.

In testing my invention in an institution having over one hundred patients, I have succeeded in reducing on several occasions the number of nightly attacks to one or two. I have also tested it for three months on one hundred male epileptics giving the same patients the same quantity of bromin during each of the tests and have found that when they consumed unsalted soup and sodium bromid as prepared by me, there were 1002 epileptic attacks only during the three months; when unsalted soup was consumed and the bromin salt administered in the usual solution of water, there were 1534 epileptic attacks; when the ordinary salted food was used, there were 2,008 attacks. In other words, the employment of my invention results in a reduction of attacks of approximately 55% from those to be expected where the patients consumed ordinary food and a reduction of about 31% from the number of attacks to be expected when the patients use food without salt, but take the bromin separately. I caused a further test to be made with women and children with the same result. Naturally I found that in certain individual cases the use of my invention had very marked results but as these results appear even more clearly from long continued tests showing that the action of my tablets is a uniformly good one on any given group of patients, I need not refer further to the curative results obtained in individual cases. Apparently, although this is merely a theoretical suggestion, the addition of the bromin salt to the food after it has been cooked rather than cooking the bromin salt with the food, plays an important part in the results.

To mention some examples of the composition of my tablets, I refer to the following: 16.7 kg. of the extracts from vegetable albumin; 5.5 kg. of fat; 50. kg. sodium bromid; .5 kg. cooking salt are mixed together and formed into tablets by the usual machinery. The ingredients are finely comminuted and intimately associated with each other prior to being pressed into tablet form.

In some cases especially for the purpose of making soup, I find the addition of meat extract useful and accordingly have employed tablets of the following composition: 16.7 kg. of the extract of the vegetable albumin; 5.5 kg. fat; 7.5 kg. meat extract; 50. kg. sodium bromid, and .5 kg. cooking salt.

By pouring a suitable quantity of hot water upon one or more of such tablets, or by using instead of water a watery soup prepared without cooking salt, I produce at once a bouillon soup of pleasant odor and taste, which is entirely palatable to the patient. Obviously, the soups may be prepared in other ways. The high temperature of the cooked food or soup, provided it is not maintained too long, will not harm the combination or cause it to deteriorate. The dissolved tablets can obviously also be added to other food products cooked without salt before being served. In the case of bread, the tablet is pulverized and mixed in the dough, but in that case it is preferable to use a tablet without meat extract in it but containing the vegetable albumin to the use of which, in combination with sodium bromid, I ascribe so far as I can see at present the unexpected and new effects which these tablets bring about. Certain it is that an unsalted soup salted with sodium bromid has, if possible a worse taste than an unsalted soup, and in addition thereto, the bromin has a weak effect, whereas the effect of the same soup salted with one or more of my tablets not only has a marked therapeutical effect as described, but is entirely palatable.

For some purposes it is apparent that instead of using tablets, the new compound or preparation may be in the form of a liquid. It is not alone useful in epileptic cases, but may also be used for other diseases, such for instance, as neurasthenia.

Where in the claims, I mention specific proportions or weights or ingredients, I intend that these claims be considered with reasonable latitude with respect to the figures and with respect to equivalents for the various ingredients mentioned.

What I claim is:

1. A therapeutical preparation adapted for addition to food stuffs as a substitute for NaCl, the said preparation containing a preponderance of an alkali bromid in combination with vegetable extracts.

2. A therapeutical preparation adapted for addition to food stuffs as a substitute for NaCl, the said preparation containing a preponderance of an alkali bromid in combination with extracts of vegetable albumin.

3. A therapeutical preparation adapted for addition to food stuffs as a substitute for NaCl, the said preparation containing a preponderance of an alkali bromid in combination with vegetable extracts and a relatively minute quantity of ordinary cooking salt all intimately mixed with each other and maintained in units having the same proportion of the named ingredients.

4. A therapeutical preparation adapted for addition to food stuffs as a substitute for NaCl, the said preparation containing a preponderance of an alkali bromid in combination with vegetable extracts and a relatively minute quantity of ordinary cooking salt all intimately mixed with each other and maintained in tablet form, each tablet containing the same proportions of the named ingredients.

5. A therapeutical preparation adapted for addition to food stuffs as a substitute for NaCl, the said preparation containing a preponderance of an alkali bromid in combination with vegetable extracts, a quantity of meat extract and a relatively minute quantity of ordinary cooking salt all intimately mixed with each other and maintained in units having the same proportion of the named ingredients.

6. A therapeutical preparation comprising the combination in approximately the following proportions of the following ingredients: 50 kg. bromid, 17 kg. vegetable albumin, 5 kg. fatty matter and .5 kilogram ordinary cooking salt.

In testimony whereof I have hereunto set my hand in the presence of two subscribing witnesses.

ALFRED ULRICH.

Witnesses:
   HEINRICH KUBLI,
   PETER METZGER.